Patented June 14, 1932

1,863,212

UNITED STATES PATENT OFFICE

KARL WINKLER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF LIQUID HYDROCARBONS

No Drawing. Application filed September 13, 1927, Serial No. 219,363, and in Germany September 17, 1925.

The present invention relates to the production of liquid hydrocarbons from methane.

I have found that liquid hydrocarbons, especially such as belong to the benzene series, are obtained by passing methane at temperatures of at least 500° C. and under pressure over catalysts. In addition to methane the gas subjected to the said treatment may also contain other constituents for for example carbon monoxid, nitrogen, hydrogen or the like, but should be substantially free from other hydrocarbons. The reaction is carried out as stated above, at temperatures of at least 500° C.; however, generally speaking a somewhat higher temperature ranging for example between 600 and 900° C. is more suitable. The pressure employed for carrying out my present invention must be rather high. It is not sufficient to work under pressures of a few atmospheres, but the pressure should be at least 20 atmospheres; but I have found that specifically when working at pressures of at least 50 atmospheres excellent yields of liquid hydrocarbons are obtained and that preferably still more, for example 100, 200, 500 or still more atmospheres are very suitably applied in the present invention.

The catalysts to be employed in the process here described may be of most various kinds; they may be of a metallic character, but it is more advantageous to employ catalysts of a non-metallic character, among which such as contain compounds of the alkaline earth metals including magnesium and glucinium, for example carbonates or other salts or hydroxids or oxids thereof, or compounds of selenium, tellurium or thallium, or active silica or active charcoal or mixtures of these substances with each other or with other materials, are especially suitable.

For example, very good results are obtained with aluminum, calcium phosphate, sodium borate, aluminum borate, magnesium carbonate, glucinium oxid, barium sulfate, thallium oxid, active silica, pumice stone, active carbon, or carbon deposited from carbon compounds and having a high metallic lustre.

A very suitable initial gas to be employed according to my present invention is natural gas which has the advantage of being available in abundant quantities at a low cost, so that in this way it is possible to cheaply produce valuable liquid hydrocarbons.

The following example will further illustrate how my invention may be carried out in practice, but the invention is not limited to this example.

Example

Natural gas consisting chiefly of methane, besides small quantities of ethane, propane, ethylene and other hydrocarbons, is passed under a pressure of 150 atmospheres through a high pressure vessel heated to about 600° C. or more and filled with active silica. On cooling the resulting gases, a liquid rich in hydrocarbons of the benzene series is separated.

What I claim is:

1. The process of producing liquid hydrocarbons by the conversion of methane which comprises passing natural gas substantially composed of methane at a temperature of about 600° C. and under a pressure of about 150 atmospheres over active silica.

2. The process of producing liquid hydrocarbons by the conversion of methane, which comprises passing natural gas substantially composed of methane at a temperature of about 800° C. and a pressure of about 150 atmospheres over active silica.

3. The process of producing liquid hydrocarbons by the conversion of methane which comprises passing methane at a temperature between 500 and 900° C. under a pressure not less than 50 atmospheres over a catalyst comprising an oxidic compound of an element selected from the class consisting of the alkaline earth metals, magnesium, glucinium, aluminum and silicon.

4. The process of producing liquid hydrocarbons by the conversion of methane which comprises passing methane at a temperature between 500° C. and 900° C. under a pressure of not less than 50 atmospheres over a catalyst comprising an oxidic compound of the alkaline earth metals.

5. The process of producing liquid hydrocarbons by the conversion of methane which comprises passing methane at a temperature between 500 and 900° C. under a pressure of not less than 50 atmospheres over a catalyst comprising active silica.

In testimony whereof I have hereunto set my hand.

KARL WINKLER.